(12) United States Patent
Magness

(10) Patent No.: US 6,769,605 B1
(45) Date of Patent: Aug. 3, 2004

US006769605B1

(54) MONEY TRANSFER SYSTEM

(76) Inventor: Jason P. Magness, 1125 W. Olive St., San Diego, CA (US) 92103

( * ) Notice: Subject to any disclaimer, the term of this patent is extended or adjusted under 35 U.S.C. 154(b) by 0 days.

(21) Appl. No.: 09/619,811

(22) Filed: Jul. 21, 2000

(51) Int. Cl.[7] .............................................. G06F 17/60
(52) U.S. Cl. ....................... 235/379; 235/380; 235/382; 705/35; 705/39; 705/72
(58) Field of Search ................................ 235/379, 380, 235/382; 705/39, 40, 41, 42, 35, 44, 70, 72

(56) References Cited

U.S. PATENT DOCUMENTS

| | | | | |
|---|---|---|---|---|
| 5,350,906 A | * | 9/1994 | Brody et al. | 235/380 |
| 5,864,830 A | * | 1/1999 | Armetta et al. | 235/380 |
| 6,032,136 A | * | 2/2000 | Brake, Jr. et al. | 705/41 |
| 6,044,360 A | * | 3/2000 | Picciallo | 235/380 |
| 6,173,269 B1 | * | 1/2001 | Solokl et al. | 705/39 |
| 6,467,684 B2 | * | 10/2002 | Fite et al. | 235/379 |
| 6,615,189 B1 | * | 9/2003 | Phillips et al. | 705/41 |

* cited by examiner

Primary Examiner—Michael G. Lee
Assistant Examiner—Ahshik Kim
(74) Attorney, Agent, or Firm—Leonard & Proehl PLLC; Jeffrey A. Proehl

(57) ABSTRACT

A method of promptly transferring cash from a sender to a receiver who is some distance from the sender. The intended receiver obtains a free unactivated cash card. The card includes an identification number, a magnetic strip for recording an amount of money and a passcode and indicia identifying the agency supplying the card. The receiver contacts an activating agent who activates the card and provides a passcode, typically four digits. The receiver contacts the sender and agree on the amount of money to be transferred. The sender then contacts the agent and requests that a sum of money be transferred to the cash card, identifying the particular card by the card identification number. The sender then deposits the sum with the agent, who credits the cash card with that amount. The cash card then may be used by the receiver to obtain cash at authorized ATM's or obtain goods and services from authorized vendors

16 Claims, 3 Drawing Sheets

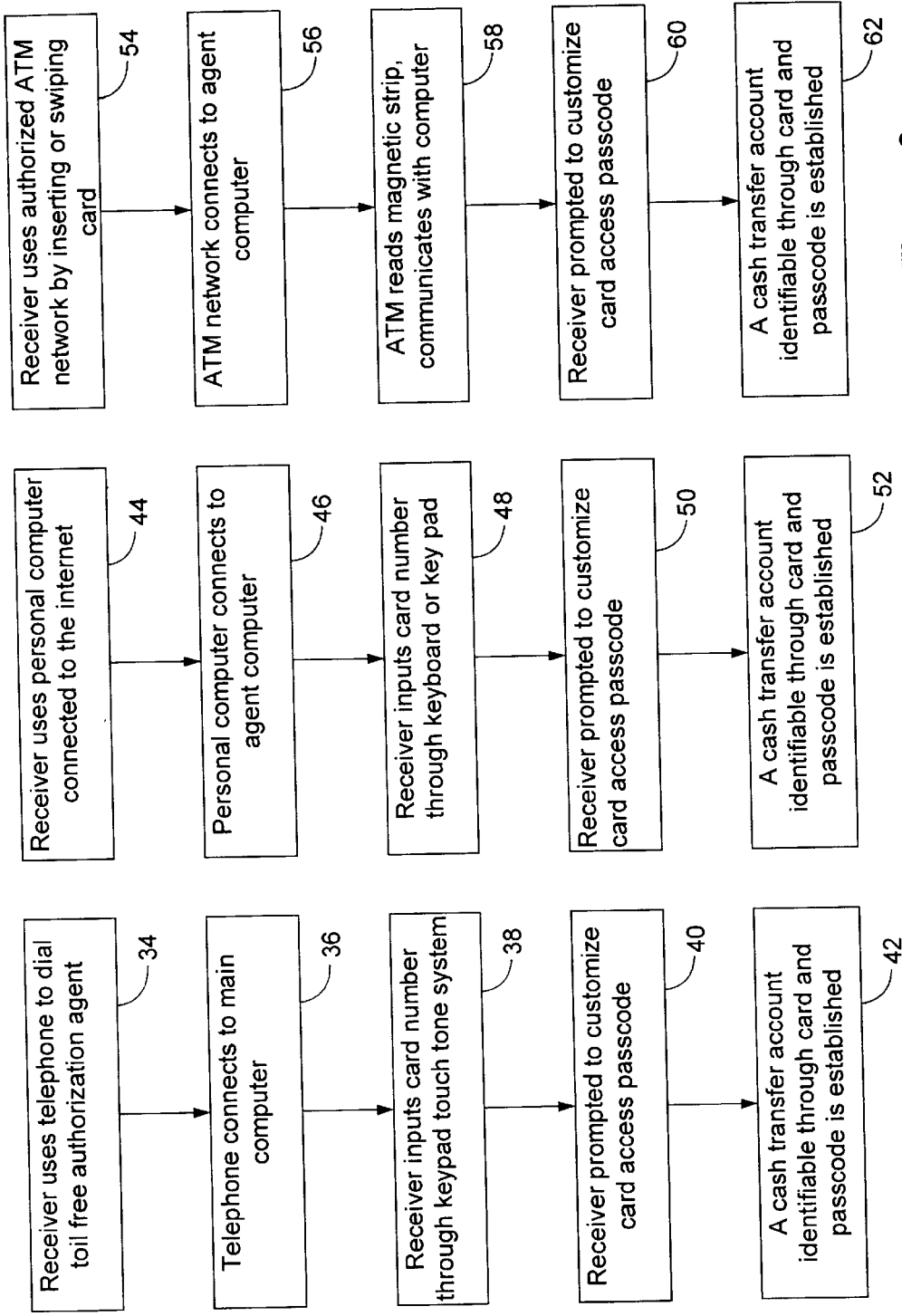

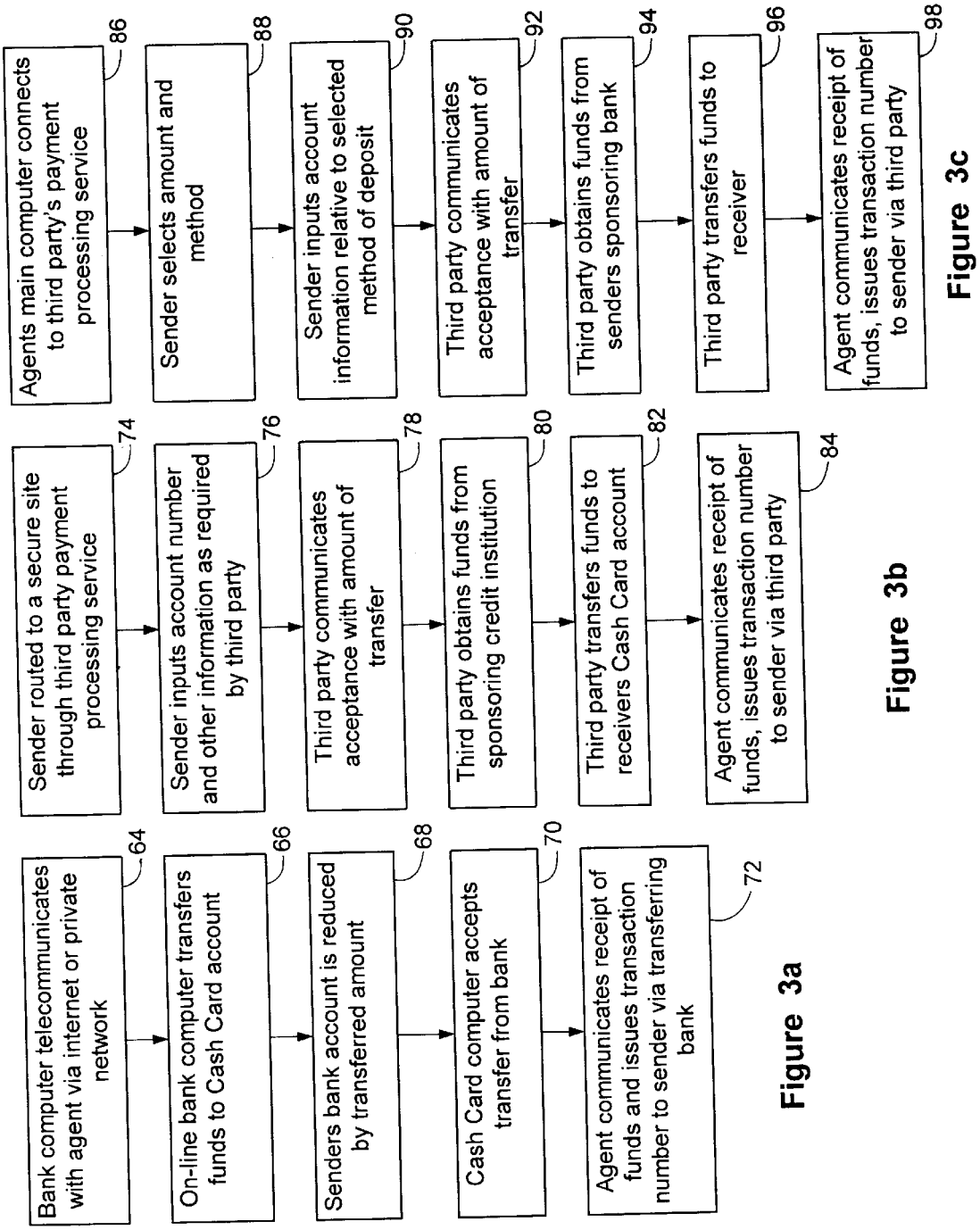

MONEY TRANSFER SYSTEM

FIELD OF THE INVENTION

This invention relates to methods of transferring money in from a sender to a distant recipient.

BACKGROUND OF THE INVENTION

Conventional bank checking and savings accounts are often not available to minors or persons with poor credit or financial status. Even if those persons have a savings account, generally they will have to visit the savings institution in person at inconvenient times to receive cash.

Often a person away from home in a different city or foreign country on business, vacation, etc. or a student away from home at school has a need for additional money. Where a purchase is to be made, a conventional check or credit card often suffices. However, many establishments do not accept out-of-town checks and not everyone has a checking account. Also, not everyone carries credit cards and not all vendors take credit cards or only accept certain cards. Sometimes, people are at or near their credit limit and cannot use their card. Thus, there is a need for a cash transfer from a source of funds to the person at the distant location.

Various agent-based money transfer services exist, such as those provided by Western Union and MoneyGram. While useful in some circumstances, these require a sender to go to the agent's facility, have money transferred to a site near the recipient, who then must go to the transfer agent's site to receive the cash. This is a slow and often inconvenient arrangement.

A number of methods of transferring money have been developed in attempts to alleviate at least some of these problems. For example, pre-paid calling card systems are described by Simson et al. in U.S. Pat. No. 5,721,768 and Taskett in U.S. Pat. No. 5,991,748. Upon payment of an amount to be transferred and a fee, a card is "charged" with magnetic information indicating the money value. When the card is used to make a long-distance telephone call or make a purchase, the cost is deducted. The card can be recharged at a terminal with value from a pre-authorized money amount. While quite useful, these cards require pre-payment of a base amount from which the card can be recharged. Thus, one cannot obtain a recharge when an amount beyond the pre-payment is needed. Further, these cards are generally only useful for payment for goods or services, not to obtain cash.

A number of different systems, such as that described by Konya in U.S. Pat. No. 5,937,396, are available for remotely transferring funds between accounts through use of an ATM card. However, these are not usable by those who do not have accounts of the sort accessed by these cards.

Methods of holding and dispensing cash are described by Cucinotta et al. in U.S. Pat. No. 5,633,546 and Levine et al. in U.S. Pat. No. 5,477,038. In these arrangements, cash is deposited with a holder and an ATM card is issued to the depositor. The ATM card can be used to withdraw cash up to the amount deposited. However, this card system requires pre-deposits of funds and does not conveniently allow others to recharge the account.

Thus, there is a continuing need for a cash transfer system of improved efficiency and convenience, that is useable by minors and those with poor credit histories and those who do not have checking accounts and/or credit cards and that makes the cash available to the receiver promptly without any need to go to a transfer agent's location.

SUMMARY OF THE INVENTION

The above-noted problems, and others, are overcome in accordance with this invention by a method of transferring cash from a sender to a receiver which basically involves a person intending to receive cash (the "receiver") sent from another person (the "sender") initially acquires an unactivated cash card, then contacts an issuing agent for the company operating the system to have the card activated. The card is generally similar to an ATM or debit card, having a unique serial number, a magnetizable strip and indicia identifying the issuing company and agent to contact. Contact may be made in any suitable manner, such as by telephone (usually a toll-free number), by on-line banking methods, via the internet to the company's website or through an authorized ATM.

When contacted, the issuing agent prompts the receiver to enter the card number, generally through the keypad or keyboard on the telephone, computer or ATM. The receiver then provides a custom passcode (also known as a personal identification number), generally a four-digit number.

The receiver then contacts the sender who is to provide the funds, giving the sender the card account identification number. The sender deposits funds into the card account in any suitable manner. Typically the deposit may be made using online banking via a personal computer, directing his or her bank to transfer funds to the cash card account number. Or, the transfer may be made by the sender contacting the system agent and authorizing transfer to the cash card account number from his or her credit or debit card. Alternatively, the sender may deposit cash or use an alternative payment such as check, credit/debit card personally with a local issuing agent of the operating company.

The funds transfer electronically through a transfer clearing system and appears as a credit available to the cash card account number.

The receiver may now access the funds by using the cash card, with his or her passcode, at any authorized ATM, or may purchase goods from authorized vendors or may receive services from an authorized vendor in the same manner as using a debit card.

The sender (or other senders) may later add additional funds to the cash card, although it may be more convenient to just use a new, free, card.

BRIEF DESCRIPTION OF THE DRAWING

Details of the invention, and preferred embodiments thereof will become apparent upon reference to the drawing, wherein:

FIG. 2a is a flow diagram illustrating a first embodiment of the method of activating a cash card;

FIG. 2b is a flow diagram illustrating a second embodiment of the method of activating a cash card;

FIG. 2c is a flow diagram illustrating a third embodiment of the method of activating a cash card;

FIG. 3a is a flow diagram showing a first embodiment of the transfer clearing steps;

FIG. 3b is a flow diagram showing a second embodiment of the transfer clearing steps; and FIG. 3c is a flow diagram showing a third embodiment of the transfer clearing steps.

DETAILED DESCRIPTION OF PREFERRED EMBODIMENTS

Figure 1:
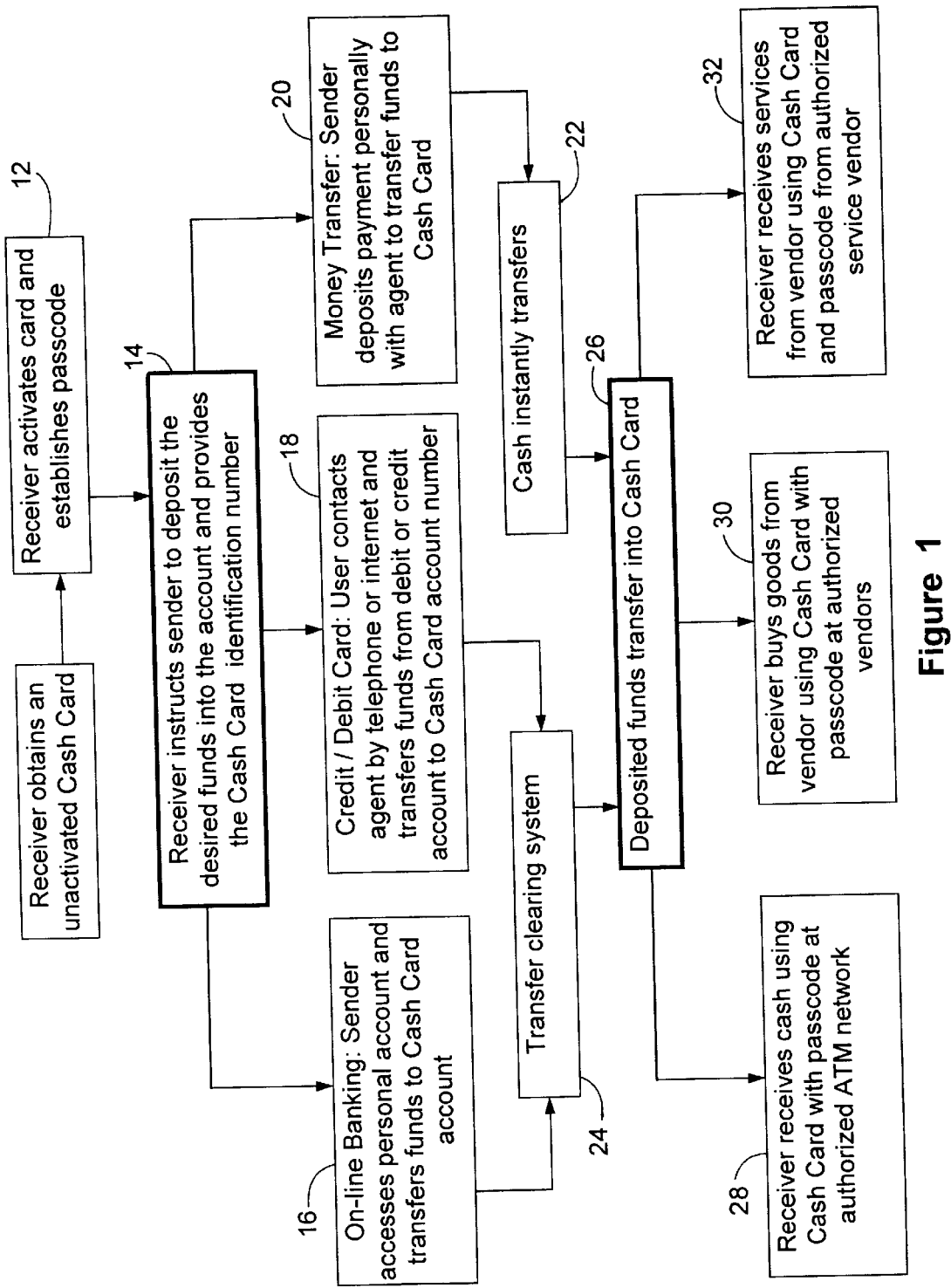
FIG. 1 is a flow diagram showing the steps in the overall method of this invention.

Referring to FIG. 1, there is shown a flow diagram of the method of transferring cash from a sender to a receiver according to this invention.

Initially, a person wishing to receive money from a sender at some distance away obtains an unactivated cash card as indicated in block 10. The cash cards are typically free and can be obtained from various sources, such as by mail upon request by telephone, internet or mail from the company operating the cash card system, from a local company issuing agent, etc. The cards bear an identification number, a magnetic strip that can be coded with a money amount and indicia identifying the operating company and company contact information such as telephone number, website, etc.

Next, the receiver activates the card by contacting the company issuing agent by telephone, internet, ATM, etc. to request activation, as indicated in block 12. The receiver will also select a passcode, typically a four-digit number. Details of several embodiments of the method for activating the cash card are provided in FIGS. 2a, 2b, and 2c as detailed below.

Next the receiver contacts the sender and gives him or her the cash card identification number and they agree on the amount to be deposited to that cash card as indicated in block 14.

The sender may then transmit the agreed funds to the cash card account in any suitable manner. Three optimum embodiments of this fund transfer step are shown in FIG. 1. As indicated in block 16, the sender may use an online banking system. The sender uses a personal computer to access his or her personal bank account and directs a transfer of the funds to the account of the receivers card identification number. The transaction is executed in the transfer clearing section, as described below.

Alternatively, the sender may wish to transfer funds from a credit or debit card to the receiver as indicted in block 18. In this case, the sender contacts the company agent by telephone or the internet and directs that the funds be transferred from a credit or debit card account to the cash card per the card identification number specified by the receiver.

In another embodiment, the sender may directly deposit cash or a cash alternative (e.g., check, credit/debit card) with an authorized issuing agent of the company, as indicated in block 20. This is most convenient where there is an authorized company agent near the sender. Cash can be instantly transferred to the cash card if desired, as indicated by block 22. Alternatively, when the agent receives the funds, transfer of the amount to the cash card having the identification number specified by the receiver is authorized by the issuing agent and may be processed in the transfer clearing system.

Once an authorized issuing agent approves transfer of funds to the receiver as requested in any of the embodiments shown in blocks 16, 18 and 20, the transfer is accomplished by a transfer clearing system as indicated in block 24. Three embodiments of the transfer clearing system are described in conjunction with FIGS. 3a, 3b and 3c, below.

Once the transfer is cleared, the funds are deposited in the account corresponding to the cash card identification number, as indicated in block 26.

The receiver may utilize the funds available in the cash card in any suitable manner, generally similar to the manner in which a debit card is used. Whenever funds are expended, the amounts are automatically deducted from the card until the total is expended.

As indicated in block 28, the receiver may take the cash card to any authorized ATM and receive cash, entering the passcode to identify the specific receiver. As indicated in block 30, the receiver may take the card to any authorized store or the like and purchase merchandise, with the receiver identified by the passcode. Again, as funds are expended the amount remaining in the card is automatically correspondingly reduced. Similarly, services may be purchased from authorized providers upon presentation of the card and passcode as indicated in block 32.

FIG. 2a illustrates the steps in a first embodiment of cash card activation where activation is accomplished by telephone. The receiver calls the activation number at a central company location, generally on a toll-free line as indicated in block 34. While a person could answer the call and perform the activation sequence, generally it is preferred that an automated computer-based system be used. The telephone call is received and automatically connected to a main computer system, as shown in block 36. In response to a prompt, the receiver types in the card identification number on the telephone keypad, as indicated in block 38. If the receiver is calling on a rotary telephone, the computer will switch the call to a person to handle the activation. As indicated in block 40 the receiver then enters a custom passcode number, typically four digits upon prompting by the computer as shown in block 42. The computer then establishes a cash transfer account identifiable through the card identification number and the passcode. Money can then be transferred to the cash card as described above.

FIG. 2b illustrates a second method for activating a cash card. In this case, the receiver uses a personal computer connected to the internet, per block 44. The receiver connects to the cash card company website, as indicated in block 46. As shown in block 48, upon prompting the receiver inputs the cash card identification number through the computer keyboard or keypad. Next, the receiver is prompted to type in a custom card access passcode, typically a four-digit number, as indicated in block 50. As before, a cash transfer account is established into which a sender may transfer funds.

FIG. 2b illustrates a third embodiment of the cash card activation sequence. The receiver takes an unactivated cash card to an authorized ATM and inserts it as shown in block 54. The conventionally programmed ATM network connects to the cash card operating company main computer, as indicated in block 56. The ATM reads the magnetic strip bearing the card identification number and transmits it to the main computer per block 58. The receiver is prompted to enter a custom passcode, typically a four-digit number as indicted in block 60. As shown in block 62 and described above a cash card account is established that can be accessed by a sender to transfer funds to the card.

FIGS. 3a, 3b and 3c illustrate three embodiments of the steps required to clear the transfer. While prior systems require interaction with a money transfer agent for both sending and receiving money, the system of this invention does not require a transfer agent for either sending or receiving funds.

The sequence as shown in FIG. 3a is preferably used where the transfer is accomplished through on-line banking as illustrated in block 16 of FIG. 1. As indicated in block 64, FIG. 3a, the transferring bank establishes a telecommunication contact with the cash card company via the internet or a private network. The online bank then transfers funds deposited by the sender to the receiver's cash card account (block 66) and debits the sender's account correspondingly (block 68). The cash card company computer accepts the transfer from the online bank, per block 70. Finally, the company computer notifies the sender of receipt of the funds and issues a transaction number via the transferring bank.

An embodiment of the transfer clearing system particularly suitable where the transfer is accomplished via the internet with a cash card company website is illustrated in FIG. 3b. When the sender accesses the system to make the transfer of funds, he or she is routed to a secure website through a third party payment processing service, as indicated in block 74. Any suitable secure third party processor, such as Authorizenet, may be used. The sender inputs his or her account number and other identification information as may be required by the third party, per block 76. If everything is correct and proper, the third party communicates acceptance of the transfer and the amount of the transfer to the sender, as indicated in block 78. The third party then obtains the transferred funds from the bank or other credit institution sponsoring the debit or credit card used by the sender (block 80). Next, as indicated in block 82 the third party transfers the funds to the receiver's cash card account. Finally, the cash card company notifies the sender of the transaction and issues a transaction number to the sender through the third party.

FIG. 3c illustrates the steps in the sequence clearing a transfer accomplished by telephone as shown in block 18, FIG. 1. After the telephone transfer is initiated by the sender, the cash card company main computer connects the sender to a conventional third-party payment service (block 86). The sender selects the amount and method of deposit (block 88), which may be accomplished by charging a credit or debit card, an electronic check, etc. The sender then inputs account information relative to the selected method of making the deposit, per block 90. The third party then notifies the sender of acceptance of the transfer and the amount transferred (block 92). In accordance with the payment method selected by the sender, the third party obtains funds from the senders as indicated in block 94 and transmits the funds to the receivers cash card account, as indicated in block 96. Finally, the cash card company communicates receipt of the funds and issues a transaction number to the sender through the third party.

Other variations, applications and ramifications of the present invention will occur to those skilled in the art upon reading this disclosure. Those are intended to be included within the scope of this invention, as defined in the appended claims.

I claim:

1. A method of transferring cash from a sender to a receiver which comprises the steps of:
    a receiver obtains an unactivated cash card which includes a card identification number, indicia identifying the sponsoring company and machine readable means for indicating a variable amount of money;
    said receiver contacts an agent of the sponsoring company for card activation;
    said receiver provides a passcode to said agent;
    said agent activates said cash card;
    said receiver contacts a sender and requests transfer of an amount of money from sender to said cash card and provides said cash card identification number;
    sender deposits funds with said agent for crediting to said cash card; and
    said agent credits said cash card with said amount of money and causes said machine readable means to indicate said amount of money;
    whereby said receiver may use said cash card to obtain cash, services and goods.

2. The method according to claim 1 wherein said cash card is activated by said agent in response to said receiver calling said agent by telephone, inputting said card identification number, inputting a custom passcode and having said agent establish a cash card account.

3. The method according to claim 1 wherein said cash card is activated by said agent in response to said receiver connecting to the internet through a personal computer, connecting to said agent's website, inputting said card identification number, inputting a custom passcode and having said agent establish a cash card account.

4. The method according to claim 1 wherein said cash card is activated by said agent in response to said receiver entering said cash card into an ATM, being connected to said agent's computer by said ATM, inputting said card identification number, inputting a custom passcode and having said agent establish a cash card account.

5. The method according to claim 1 wherein
    said sender deposits funds by accessing his or her personal online banking account at his or her bank and directs that an amount of money be transferred from said banking account to said cash card account number;
    said bank establishes communication with said agent, transfers said amount of money to said cash card account and reduces said sender's bank account by said amount;
    said agent communicates receipt of said money and issues transaction number to said sender; and
    said agent credits said cash card account with said money.

6. The method according to claim 1 wherein
    said sender contacts said agent by connecting to the internet through a personal computer and connecting to said agents website;
    said sender requests that an amount of money be transferred from his or her debit or credit card account to said cash card account number;
    said agent routs said sender to a secure site through a third party payment processing service;
    sender inputs account number and any other information requested by said third party payment processing service;
    said third party payment processing service communicates acceptance and said amount to be transferred;
    said third party payment processing service obtains said amount of money from sender's credit or debit card sponsoring credit institution;
    said third party payment processing service transfers said amount of money to said agent; and
    said agent credits said cash card account with said amount of money.

7. The method according to claim 1 wherein
    said sender contacts said agent by telephone and directs that an amount of money be transferred from his or her debit or credit card account to said cash card account number;
    said agent connects through a computer to a third party payment processing center;
    sender provides said third party payment processing center with information identifying the account to be debited;
    third party obtains said amount of money from said sender's account;
    third party transfers said amount of money to said agent;
    said agent credits said cash card account with said amount of money.

8. The method according to claim 1 wherein
    said sender deposits funds by making a direct deposit of an amount of money with said agent and directs that said money be credited to said cash card account number, said money being selected from the group consisting of cash, checks, credit cards and debit cards;

said agent immediately credits said cash card with said amount of money.

9. A method of transferring cash from a sender to a receiver which comprises the steps of:

initiating by a receiver a card account with an agent of a sponsoring company for receiving money from a sender, comprising:

obtaining by a receiver an unactivated cash card which includes a card identification number, indicia identifying the sponsoring company and machine readable means for indicating a variable amount of money;

contacting said agent of the sponsoring company by said receiver for activation of said cash card;

providing a passcode to said agent by said receiver;

activating by said agent said cash card and establishing a card account corresponding to said cash card;

providing said sender with said card identification number by said receiver and requesting that said sender transfer an amount of money from said sender to said card account;

transferring funds by said sender into said card account after said receiver initiates said card account, comprising:

depositing funds by said sender with said agent for crediting to said card account associated with said cash card; and crediting said card account with said amount of money by said agent.

10. The method according to claim 9 wherein contacting said agent includes calling said agent by telephone, inputting said card identification number, and inputting a custom passcode.

11. The method according to claim 9 wherein contacting said agent includes connecting to the internet through a personal computer, connecting to a website of said agent, inputting said card identification number, and inputting a custom passcode.

12. The method according to claim 9 wherein contacting said agent includes entering said cash card into an ATM, connecting to a computer of said agent via said ATM, inputting said card identification number, and inputting a custom passcode.

13. The method according to claim 9 wherein depositing funds by said sender includes accessing his or her personal online banking account at his or her bank and directing that an amount of money be transferred from said banking account to said card account;

establishing by said bank communication with said agent, transferring said amount of money to said card account and reducing said sender's banking account by said amount;

communicating by said agent receipt of said amount of money and issuing a transaction number to said sender.

14. The method according to claim 9 wherein depositing funds includes:

contacting by said sender said agent by connecting to the internet through a personal computer and connecting to a website of said agent;

requesting by said sender that an amount of money be transferred from his or her debit or credit card account to said card account;

routing by said agent said sender to a secure site through a third party payment processing service;

inputting by said sender an account number and any other information requested by said third party payment processing service;

communicating by said third party payment processing service acceptance and said amount to be transferred;

obtaining by said third party payment processing service said amount of money from a sponsoring credit institution of said sender's credit or debit card; and transferring by said third party payment processing service said amount of money to said agent.

15. The method according to claim 9 wherein depositing funds includes:

contacting by said sender said agent by telephone and directing that an amount of money be transferred from his or her debit or credit card account to said card account;

connecting by said agent through a computer to a third party payment processing center;

providing by said sender said third party payment processing center with information identifying the account to be debited;

obtaining by a third party said amount of money from said sender's account; and transferring by said third party said amount of money to said agent.

16. The method according to claim 9 wherein depositing funds includes depositing by said sender funds by making a direct deposit of an amount of money with said agent and directing that said money be credited to said card account, said money being selected from the group consisting of cash, checks, credit cards and debit cards.

* * * * *